W. BALLARD.
Grain-Drill.
No. 36,554.
Patented Sept. 30, 1862.
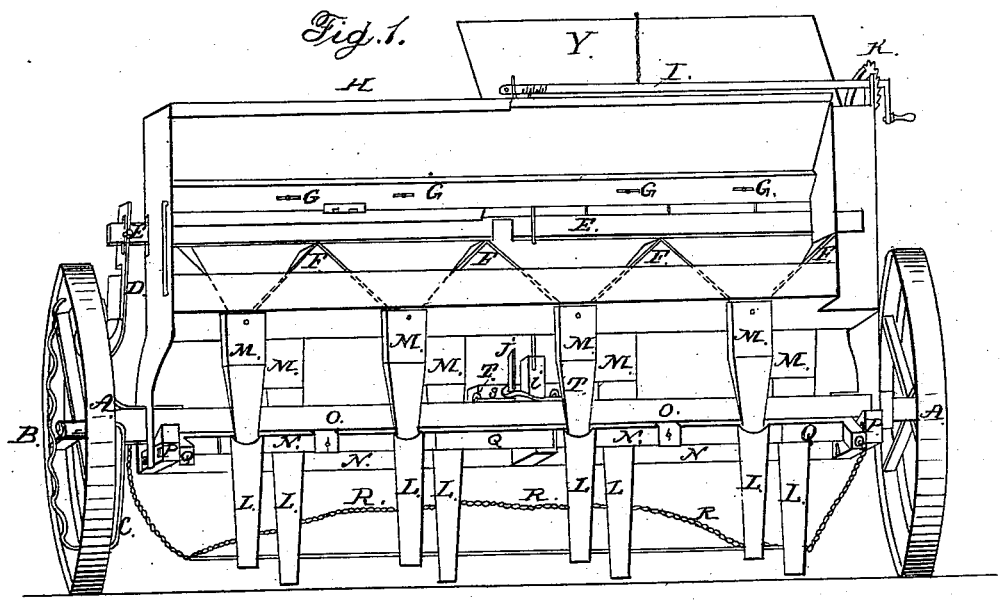
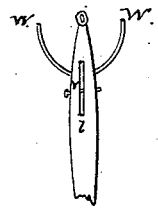
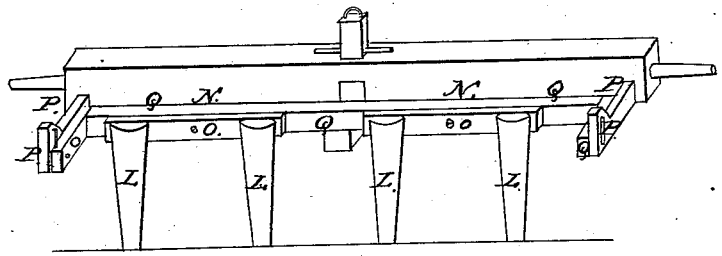
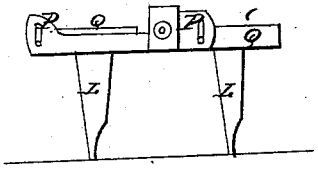
WITNESSES:
Chas Foster
W. S. Knight
INVENTOR.
Wm Ballard

UNITED STATES PATENT OFFICE.

WILLIAM BALLARD, OF HOMER, NEW YORK.

IMPROVEMENT IN GRAIN-DRILLS.

Specification forming part of Letters Patent No. 36,554, dated September 30, 1862.

*To all whom it may concern:*

Be it known that I, WILLIAM BALLARD, of Homer, in the county of Cortland and State of New York, have invented a new and useful Improvement in Grain-Drills; and I do hereby declare that the following is a full, clear, and exact description of the construction and operation of the same, reference being had to the annexed drawings, making a part of this specification, of which—

Figure 1 is a perspective view of the drill in readiness to be used for sowing grain, the other figures representing portions or parts of the machine.

A A are the wheels upon an ordinary axle, with the seed-box above, the grain dropping through into the hoppers, the divisions between which are marked F F, of which there are two sets, one in front and the other in the rear, by which the seed is collected and transmitted into the conductors $m\,m$, fitting loosely into the drills L L, which are firmly attached in pairs to the bars $n\,n$, and these bars are pivoted at their centers to the long bar $q$, which has an elbow at each end, which elbows are hinged by a pivot in a perpendicular slot to the cross-pieces P P, and these are firmly fixed upon the under side of the axle and at right angles to it. This arrangement of the drills allows each pair to operate separately and vibrate sidewise on the pivots at O O, and again allows a swinging motion of the whole upon the swing-bar $q$, while the slots at P P allow the whole drills to rise and fall to adapt themselves to the inequalities of the ground. The flow of grain is regulated by the slides Y upon the inside of the feed-box, held in position, as desired, by thumb-screws $g\,g$.

E is the seed-box, with projections upon the upper side to distribute and shake down the seed, and is driven by either of the cams B or C on the wheel A, acting upon a roller on the spring-bar D.

The windlass I, by means of a cord, serves by winding up to hoist the bars $q$ and $n$, with the drills attached, for the purpose of moving from field to field, and weights are placed in the weight-boxes $s$, placed on the bars $q$, to regulate the depth at which the drills are desired to run.

V is the pole to be attached by the stop at $v$ over the perpendicular bar J, the braces fitting into staples $t\,t$.

R R is a heavy chain, dragging loosely behind to level the ground and cover any seed which the drills may leave uncovered.

What I claim, and desire to secure by Letters Patent, is—

The manner of attaching the drills upon a vibrating bar, $n$, to the adjustable bar $q$ and the peculiar construction of said bar $q$ with elbowed or crooked ends and the manner of supporting it by a pivot working in a slot, the whole to be used in combination, as above set forth.

WM. BALLARD.

Witnesses:
 CHAS. FOSTER,
 FRED S. KNIGHT.